(12) United States Patent
Horn

(10) Patent No.: US 7,332,247 B2
(45) Date of Patent: Feb. 19, 2008

(54) ELECTRODE FOR AN ELECTROCHEMICAL CELL AND PROCESS FOR MAKING THE ELECTRODE

(75) Inventor: Quinn C. Horn, North Olmsted, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 246 days.

(21) Appl. No.: 10/199,702

(22) Filed: Jul. 19, 2002

(65) Prior Publication Data

US 2004/0013940 A1 Jan. 22, 2004

(51) Int. Cl.
*H01M 4/42* (2006.01)
*H01M 4/60* (2006.01)
*H01M 4/62* (2006.01)

(52) U.S. Cl. .................. 429/229; 429/212; 429/217

(58) Field of Classification Search ................ 429/209, 429/229
See application file for complete search history.

(56) References Cited

U.S. PATENT DOCUMENTS

| 2,480,839 | A |   | 9/1949 | Daniel |
| 3,655,447 | A |   | 4/1972 | Griffiths et al. |
| 4,470,939 | A |   | 9/1984 | Schoolcraft |
| 5,198,315 | A | * | 3/1993 | Tada et al. .................. 429/209 |
| 6,022,639 | A | * | 2/2000 | Urry .......................... 429/229 |
| 6,284,410 | B1 | * | 9/2001 | Durkot et al. .............. 429/229 |
| 6,300,011 | B1 |   | 10/2001 | Lin et al. |

FOREIGN PATENT DOCUMENTS

| JP | 57-182972 | 11/1982 |
| WO | WO 98/41476 | 9/1998 |
| WO | WO 99/07030 | 2/1999 |
| WO | 01/56098 | 2/2001 |

OTHER PUBLICATIONS

An SEM photomicrograph of an alkaline cell anode.

* cited by examiner

*Primary Examiner*—Patrick Joseph Ryan
*Assistant Examiner*—Julian Mercado
(74) *Attorney, Agent, or Firm*—Michael C. Pophal

(57) ABSTRACT

A cell and a method for preparing an electrochemical cell having an electrode containing a mixture of agglomerated particles and nonagglomerated particles are disclosed. The process enables the incorporation of small particles of electrochemically active material, such as zinc dust, into the electrode's formula while preventing undesirable segmentation of the particles.

11 Claims, 3 Drawing Sheets

ELECTRODE FOR AN ELECTROCHEMICAL CELL AND PROCESS FOR MAKING THE ELECTRODE

BACKGROUND OF THE INVENTION

This invention generally relates to electrochemical cells that utilize an electrode having an electrochemically active material in particulate form. More specifically, this invention pertains to electrochemical cells having a quantity of agglomerated zinc particles in the anode.

Cylindrically shaped electrochemical cells are suitable for use by consumers in a wide variety of devices such as flashlights, radios and cameras. Batteries used in these devices typically employ a cylindrical metal container to house two electrodes, a separator, a quantity of electrolyte and a closure assembly that includes a current collector. Typical electrode materials include manganese dioxide as the cathode and zinc as the anode. An aqueous solution of potassium hydroxide is a common electrolyte. A separator, conventionally formed from one or more strips of paper, is positioned between the electrodes. The electrolyte is readily absorbed by the separator and anode.

Commercially available cylindrical alkaline batteries use an anode that includes zinc in particulate form. The anode is a gel that has absorbed an aqueous electrolyte. The zinc particles are uniformly dispersed within the gel so that particle-to-particle contact establishes an electrically conductive matrix throughout the anode. A current collector contacts the zinc and provides an electrically conductive path between the anode and one of the cell's terminals.

Due to the ever present desire to provide consumers with better performing batteries, battery engineers are constantly striving to improve the length of time that a battery will power a consumer's device. One key objective is to improve the service of the battery on high drain. For example, JP Kokai 57[1982]-182972 discloses that the high discharge characteristic of a battery can be improved by incorporating 5-30 weight percent of the zinc as particles with a particle size of 25 μm or smaller. Unfortunately, there are problems associated with increasing the quantity of zinc dust or fines. One disadvantage is that an increase in the percentage of zinc dust and/or zinc fines results in increased gassing within the cell. Another disadvantage is that the increase in the quantity of zinc dust causes a corresponding increase in the viscosity of the anode gel which results in processing problems in high speed manufacturing processes.

An alternative to adding zinc dust or fines to an anode gel is to decrease the average diameter of the zinc particles whereby the total surface area of the zinc increases proportionally. Unfortunately, as the average diameter of the zinc particles decreases, there is a corresponding increase in the percentage of zinc fines or dust. One disadvantage to increasing the quantity of zinc dust by decreasing the average particle size is that the dust may become separated from the larger zinc particles during transit and storage of the zinc prior to its incorporation into an anode gel. The zinc dust particles also tend to become separated from the larger zinc particles during the manufacture and transit of the anode gel. Unintended separation of the large particles from the small particles can negatively impact the quality of the anode gel and the quality of the cell containing the anode gel. Consequently, although battery manufacturers would like to improve the battery's service by including greater quantities of zinc dust or fines in the anode formulation, the above described problems limit the quantity of zinc dust that can be incorporated into the anode formula.

Therefore, there exists a need for a process that enables battery manufacturers to incorporate greater quantities of zinc dust in the anode formulation without sacrificing efficiency in the cell manufacturing process. There also exists a need for an electrochemical cell that incorporates zinc dust into the anode in a manner that effectively prevents the zinc dust from becoming separated from the larger zinc particles during cell manufacturing and/or when the cell is used by the consumer.

BRIEF SUMMARY OF THE INVENTION

The present invention provides an electrochemical cell with an electrode comprising electrochemically active material in particulate form that enhances the cell's service performance on high drain tests. The electrochemically active material includes a variety of particle sizes that do not become segregated in an undesirable manner prior to or during the electrode manufacturing process. The present invention also provides a process for incorporating small particles, such as fines or dust, into the cell's electrode.

In one embodiment, the electrochemical cell of the present invention includes an open ended container that defines a cavity and includes a first electrode disposed within the cavity. A second electrode is disposed within the cavity. The second electrode includes a mixture of nonagglomerated particles of electrochemically active material and agglomerates of electrochemically active material. A separator forms an ionically permeable and electronically nonconductive barrier between the first electrode and the second electrode. A closure member is secured to the open end of the container.

The present invention also relates to a process for manufacturing an electrochemical cell comprising the following steps. In a step, providing an open ended container that includes a first electrode which defines a cavity. A separator lines the cavity. In another step, providing a second electrode having a mixture of nonagglomerated particles of electrochemically active and agglomerates of electrochemically active material. In another step, the mixture is disposed within the separator lined cavity. In another step, a closure member is secured to the open end of the container.

DETAILED DESCRIPTION OF THE INVENTION

The following terms are defined for use in this application.

The term "agglomerate", when used as a noun, means an assemblage of particles which are either loosely or rigidly joined together. Particles may be joined together via the presence of an agglomerant or, if an agglomerant is not present, each particle is physically secured to at least one other particle in the agglomerate. Agglomerates may be manually crushed thereby disassociating the particles from one another. Particles that are in close proximity to one another but are not associated via an agglomerant or physical connection are not considered to form an agglomerate.

The term "agglomerated particles" means two or more particles that form an agglomerate.

The term "nonagglomerated particles" means two or more particles that are not physically associated with each other.

The term "fines", as in "zinc fines", means particles that pass through a 200 mesh opening in a sieving screen.

The term "dust", as in "zinc dust", means particles that pass through a 325 mesh opening in a sieving screen. Dust is considered to be a subset of fines.

Figure 1:
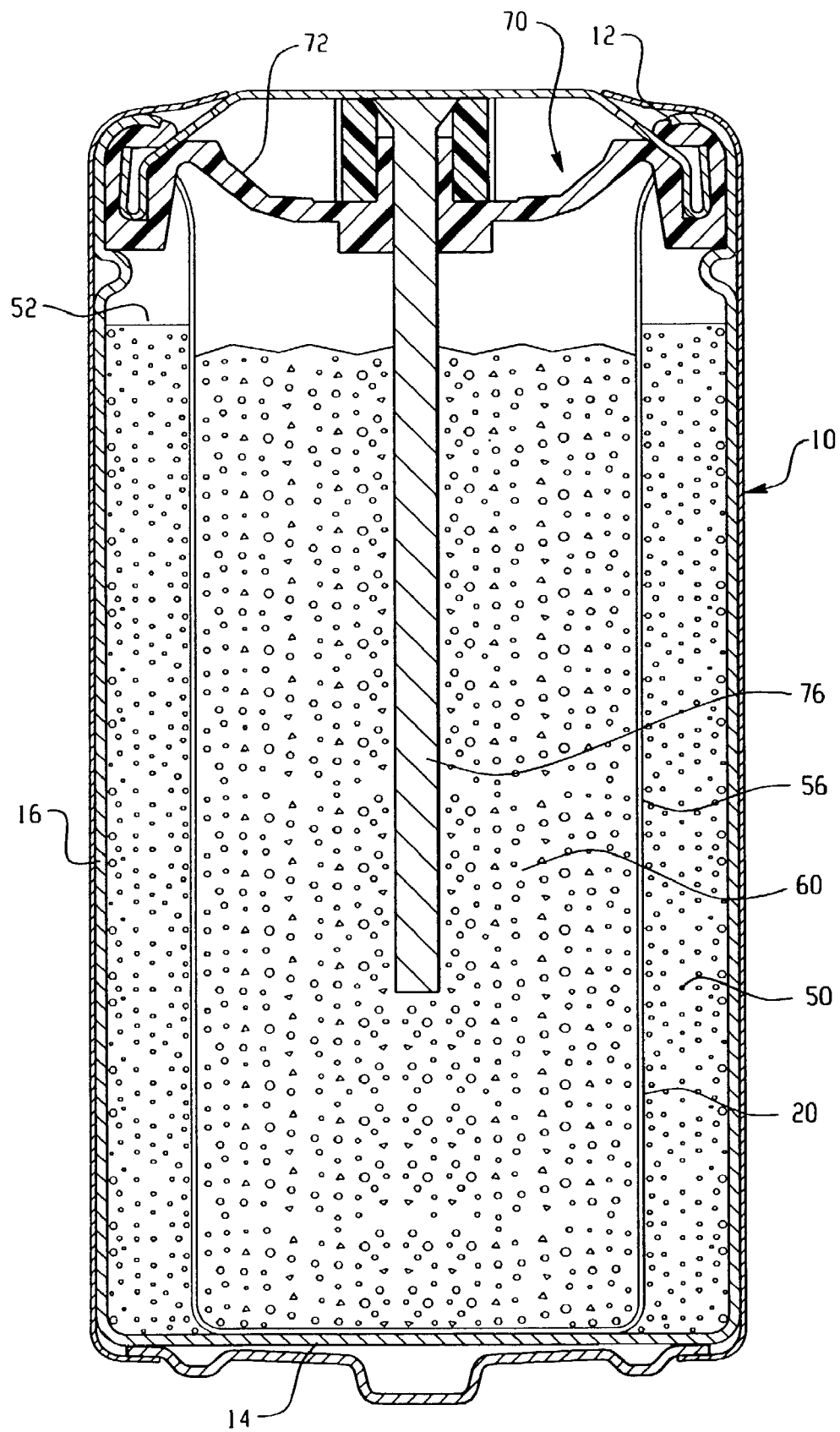
FIG. 1 is a cross section of a conventional electrochemical cell.

Referring now to the drawings and more particularly to FIG. 1, there is shown a cross-sectional view of a conventional electrochemical cell. Beginning with the exterior of the cell, the cell's components are the container 10, first electrode 50 positioned adjacent the interior surface of container 10, separator 20 contacting the interior surface 56 of first electrode 50, second electrode 60 disposed within the cavity defined by separator 20, and closure member 70 which is secured to container 10. Container 10 has an open end 12, a closed end 14 and a sidewall 16 therebetween. The closed end 14, sidewall 16 and closure member 70 define a volume in which the cell's electrodes are housed.

Second electrode 60 includes a gelling agent that swells upon absorption of the cell's electrolyte. A gelling agent suitable for use in a cell of this invention is a crosslinked polyacrylic acid, such as Carbopol 940®, which is available from Noveon of Cleveland, Ohio, USA. Carboxymethyyl-cellulose, polyacrylamide and sodium polyacrylate are examples of other gelling agents that are suitable for use in an alkaline electrolyte solution. The zinc powder may be pure zinc or an alloy comprising an appropriate amount of one or more of the metals selected from the group consisting of indium, lead, bismuth, lithium, calcium and aluminum. The zinc particles are suspended in the gelled medium.

Closure member 70 is secured to the open end of the container thereby sealing the electrochemically active ingredients within the cell. The closure member includes a seal member 72 and a current collector 76. In other embodiments, the seal body could be a ring shaped gasket. The seal member includes a vent that will allow the seal member to rupture if the cell's internal pressure becomes excessive. The seal member may be made from Nylon 6,6 or another material, such as a metal, provided the current collector is electrically insulated from the container which serves as the current collector for the first electrode. Current collector 76 is an elongated nail shaped component made of brass. The collector is inserted through a centrally located hole in the seal member.

The cell's electrolyte is a thirty-seven percent by weight aqueous solution of potassium hydroxide. The electrolyte may be incorporated into the cell by disposing a quantity of the fluid electrolyte into the cavity defined by the first electrode. The electrolyte may also be introduced into the cell by allowing the gelling medium to absorb an aqueous solution of potassium hydroxide during the process used to manufacture the second electrode. The method used to incorporate electrolyte into the cell is not critical provided the electrolyte is in contact with the first electrode 50, second electrode 60 and separator 20.

Figure 2A:
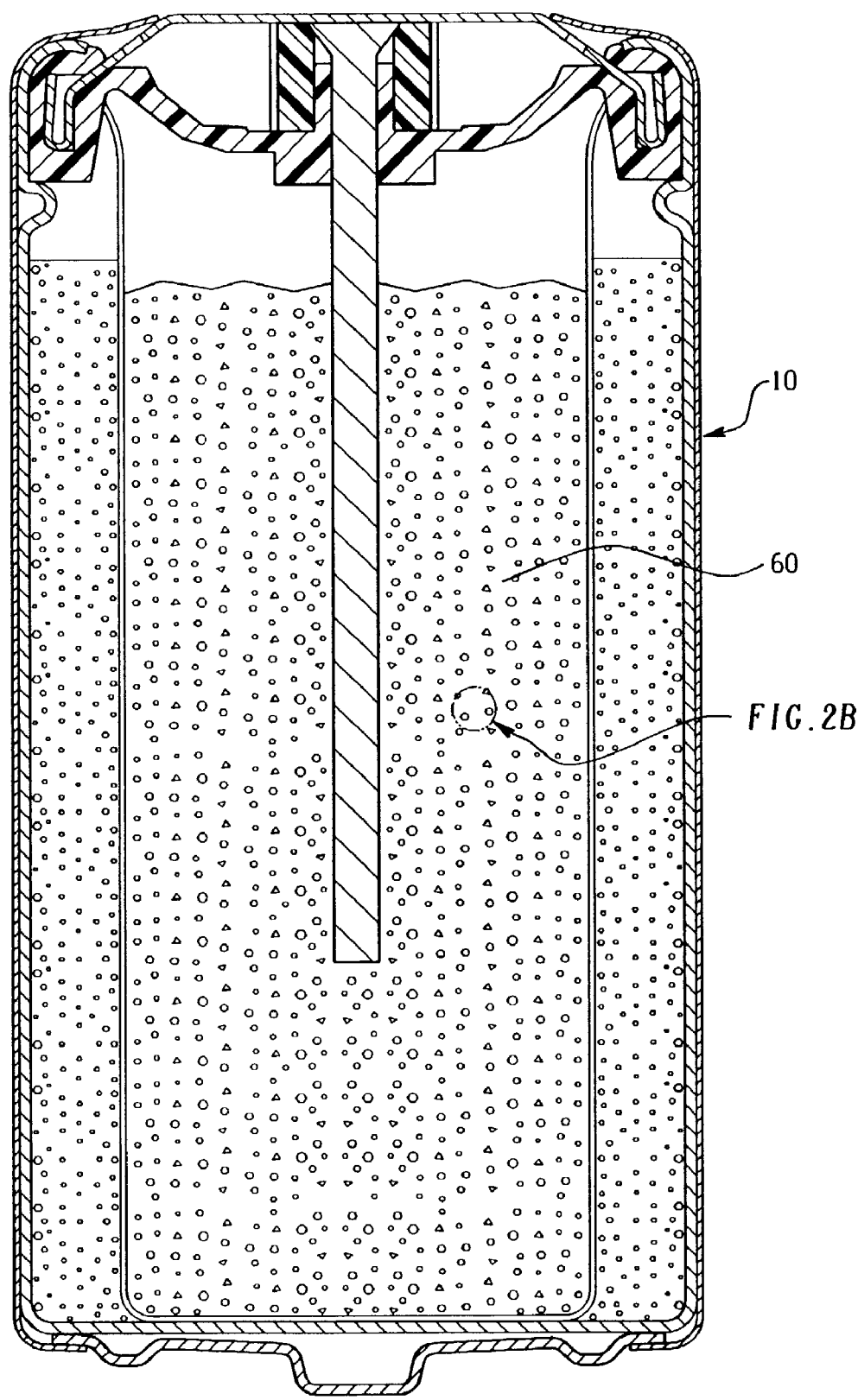
FIG. 2A is a cross section of an electrochemical cell of this invention.
Figure 2B:
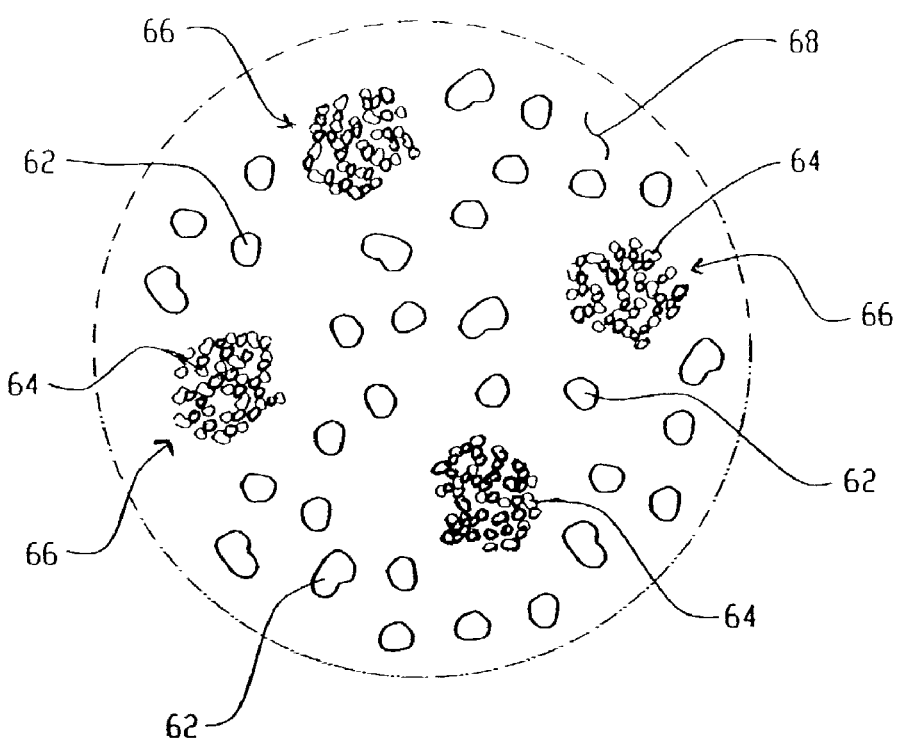
FIG. 2B is a close up drawing of a portion of the second electrode shown in FIG. 2A.

Shown in FIG. 2A is an electrochemical cell of this invention. As shown in the detailed drawing in FIG. 2B, second electrode 60 comprises particulate zinc as the electrochemically active material. A portion of the zinc particles exist as individual free flowing particles 62 which are known herein as nonagglomerated particles 62. Another portion of the electrochemically active material in second electrode 60 is comprised of agglomerated particles 64 that make up agglomerates 66. The agglomerates 66 and nonagglomerated particles 62 are suspended in gel 68 that includes absorbed electrolyte. The agglomerated particles of zinc and the nonagglomerated particles of zinc form an electrically interconnected network of particles.

Agglomerates 66 may include an agglomerant, such as polyvinyl alcohol, but an agglomerant is not required. In agglomerates that do not include an agglomerant, the particles may be caused to form agglomerates by the use of pressure, for example. If an agglomerant is used, the agglomerant must be stable in the conditions that exist within the sealed cell or to which the agglomerate is exposed during the manufacturing process. In particular, the agglomerant must not be soluble in the electrolyte contained within the cell. When an agglomerant is used, the weight of the agglomerant is typically less than five weight percent based on the weight of the agglomerated particles. Preferably, the agglomerant represents less than one weight percent of the agglomerated particles. In addition to organic agglomerants, inorganic agglomerants such as a metal with a low melting point may be used. As disclosed in U.S. Pat. No. 6,300,011, which is incorporated herein by reference, an alloy of indium and bismuth or an alloy of indium and tin can be used to form agglomerates of zinc particles.

Agglomerates suitable for use in a cell of this invention may include particles that represent essentially the entire population of electrochemically active particles or, preferably, the agglomerated particles may be selected so as to represent only a portion of the population of electrochemically active particles. In a preferred embodiment, the agglomerates include only fines which are particles that pass through a 200 mesh opening in a sieving screen. In another embodiment, the agglomerates include only dust particles which are particles that pass through a 325 mesh opening in a sieving screen. In another embodiment, the agglomerates may include a wide range of particle sizes but the total quantity of agglomerated particles in the electrode is limited to less than fifty percent by weight based on the weight of the electrochemically active particles in the cell. Alternatively, the quantity of agglomerated particles is less than twenty-five percent by weight based on the weight of the electrochemically active particles in the cell. In an even more preferred embodiment, the quantity of agglomerated particles is less than five weight percent based on the weight of the electrochemically active particles in the cell. In yet another embodiment, the quantity of agglomerated particles is less than one weight percent based on the weight of the electrochemically active particles in the cell.

In a different embodiment, the agglomerated particles may be physically and/or chemically distinguishable from the nonagglomerated particles. For example, the agglomerated particles may be made from a zinc alloy that includes bismuth, indium and aluminum while the nonagglomerated particles are made from a zinc alloy that includes only bismuth and indium. Alternatively, the agglomerated particles may include only particles made in an air atomization process while the nonagglomerated particles include only particles made in a centrifugally atomized process.

Nonagglomerated particles may be irregularly shaped particles or flakes as disclosed in U.S. Pat. No. 6,022,639, or spherical particles as disclosed in U.S. Pat. No. 4,606,869, or various other shapes as disclosed in WO 98/50,969. The nonagglomerated particles may be selected based on particle size. For example, the nonagglomerated particles may be those particles that will not pass through a 200 mesh opening in a sieving screen. Alternatively, the nonagglomerated particles may be those particles that will not pass through a 325 mesh opening in a sieving screen. The percentage of nonagglomerated particles 62 in second electrode 60, based on the weight of the electrochemically active particles in second electrode 60, is preferably greater than 50 weight percent, more preferably greater than 75 weight percent, even more preferably greater than 90 weight percent and most preferably greater than 95 weight percent.

Figure 3:
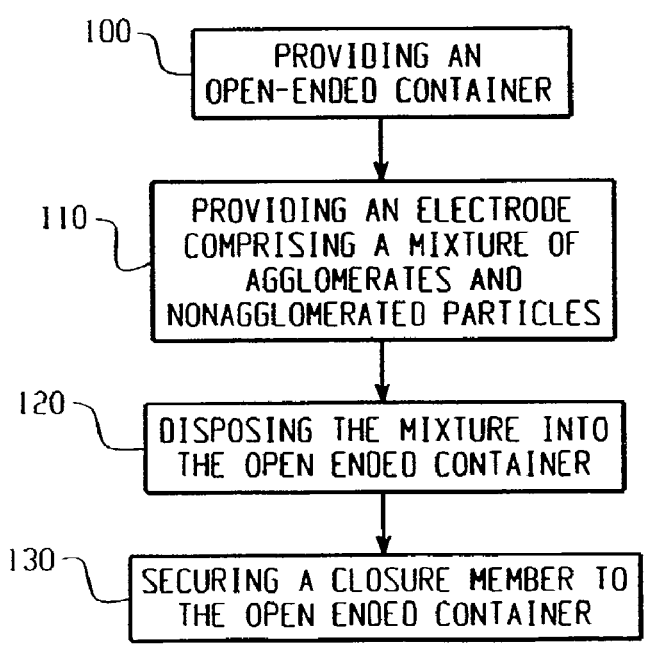
FIG. 3 is a process flow chart showing the steps in a process of this invention.

Shown in FIG. 3 are the process steps used to manufacture a cell of this invention. In step 100, an open ended container is provided. The container houses a first electrode that defines a cavity which is lined by a separator. Step 110 includes providing a second electrode comprising a mixture of nonagglomerated particles of electrochemically active material and agglomerates of electrochemically active material. In step 120, the mixture of nonagglomerated particles and agglomerates is disposed into the separator lined cavity. The mixture may form part of a gelled anode that includes a binder, electrolyte and various additives. In step 130, a closure member is secured to the open end of the container.

In step 110, the mixture of nonagglomerated particles and agglomerates can be provided via different processes. In a first process, a quantity of electrochemically active particles is sieved to separate the particles that flow through a 200 mesh sieving screen from the particles that are too large to flow through the same screen. The smaller particles, which may comprise less than one weight percent of the total weight of particles prior to sieving, are then agglomerated thereby forming agglomerates. The agglomerates are then mixed with the nonagglomerated particles that were too large to flow through a 200 mesh screen thereby forming a mixture of nonagglomerated particles and agglomerates.

In a second process, a mixture of nonagglomerated particles and agglomerates is achieved by providing a first quantity of irregularly shaped particles and a second quantity of spherically shaped particles. The irregularly shaped particles are then agglomerated to form agglomerates. The agglomerates and nonagglomerated spherically shaped particles are then mixed prior to disposing the second electrode into the container's separator lined cavity.

Step 110 may also include mixing the zinc particles, both the agglomerated particles and the nonagglomerated zinc particles, with a binder and an aqueous solution of potassium hydroxide to form a paste like composition.

In step 120, the mixture of agglomerated zinc particles and nonagglomerated zinc particles is disposed into the container's separator lined cavity so that the cavity is essentially filled with the mixture. If the mixture includes zinc particles but no binder or electrolyte, then the mixture may be poured into the container. If the mixture includes zinc particles, a binder and electrolyte, thereby forming a viscous mixture, then the mixture may need to be pumped or otherwise forcefully displaced into the container's cavity.

In step 130, a closure member is secured to the open end of the container. As shown in FIG. 1, closure member 70 may include an elastomeric seal member 72, current collector 76 and terminal cover 77. The closure member may be secured to the container by crimping the container over the peripheral portion of the seal member and/or by using an adhesive to secure the seal member to the container.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the Doctrine of Equivalents.

I claim:

1. An electrochemical cell, comprising:
   an open ended container defining a cavity;
   a first electrode disposed within said cavity;
   a second electrode disposed within said cavity, said second electrode comprising a mixture of a first set of electrochemically active particles and a second set of electrochemically active particles;
   a separator forming an ionically permeable and electrically nonconductive barrier between said first electrode and said second electrode;
   a closure member secured to the open end of said container;
   wherein the first set of electrochemically active particles comprises zinc and is not agglomerated;
   wherein the second set of electrochemically active particles comprises a zinc alloy that is chemically distinguishable from the first set of particles; and
   wherein only one of the first set or the second set of electrochemically active particles is agglomerated through use of an agglomerant, said agglomerated particles comprise less than fifty weight percent of all electrochemically active particles in the second electrode and said agglomerant is at least one selected from the group consisting of: an organic agglomerant, an inorganic agglomerant, polyvinyl alcohol, an alloy of indium and bismuth and an alloy of indium and tin.

2. The electrochemical cell of claim 1, wherein only one of the first set or the second set of electrochemically active particles passes through a 200 mesh opening in a sieving screen.

3. The electrochemical cell of claim 1, wherein only either one of the first set or the second set of electrochemically active particles passes through a 325 mesh opening in a sieving screen.

4. The electrochemical cell of claim 1, wherein said second electrode comprises a gel.

5. An electrochemical cell, comprising:
   an open ended container defining a cavity;
   a first electrode disposed within said cavity;
   a second electrode disposed within said cavity, said second electrode comprising a mixture of a first set of electrochemically active particles and a second set of electrochemically active particles;
   a separator forming an ionically permeable and electrically nonconductive barrier between said first electrode and said second electrode;
   a closure member secured to the open end of said container;
   wherein the first set of electrochemically active particles comprises zinc and is not agglomerated; and
   wherein the second set of electrochemically active particles comprises zinc alloy and is agglomerated, said second set of electrochemically active particles collectively having a different shape than that of the first set of electrochemically active particles and said second set of electrochemically active particles comprising less than fifty weight percent of all electrochemically active particles in the second electrode.

6. The electrochemical cell of claim 5, wherein the second set of electrochemically active particles passes through a 200 mesh opening in a sieving screen.

7. The electrochemical cell of claim 5, wherein the second set of electrochemically active particles passes through a 325 mesh opening in a sieving screen.

8. The electrochemical cell of claim 5, wherein said second electrode comprises a gel.

9. The electrochemical cell of claim 5, wherein an agglomerant used to agglomerate the second set of electrochemically active particles is at least one of an organic agglomerant, an inorganic agglomerant, polyvinyl alcohol, an alloy of indium and bismuth, and an alloy of indium and tin.

10. The electrochemical cell of claim 5, wherein the second set of electrochemically active particles are agglomerated by pressure.

11. The electrochemical cell of claim 5, wherein an agglomerant used to agglomerate the second set of electrochemically active particles is not soluble in an electrolyte contained within the cavity.

* * * * *